United States Patent [19]

Johnston

[11] Patent Number: 4,926,643

[45] Date of Patent: May 22, 1990

[54] CLOSED LOOP SYSTEM WITH REGENERATIVE HEATING AND PUMP-DRIVEN RECIRCULATION OF A WORKING FLUID

[76] Inventor: Barry Johnston, 2423 Pickwick Rd., Baltimore, Md. 21207

[21] Appl. No.: 381,909

[22] Filed: Jul. 19, 1989

[51] Int. Cl.$^5$ ................................................ F01K 7/34
[52] U.S. Cl. ...................................... 60/691; 60/651; 60/671; 60/693; 60/641.8
[58] Field of Search ................. 60/651, 670, 671, 690, 60/692, 693, 641.8, 691

[56] References Cited

U.S. PATENT DOCUMENTS 3,557,554  1/1971  Martinek et al. ..................... 60/671
3,830,063  8/1974  Morgan ............................. 60/670 X Primary Examiner—Allen M. Ostrager
Attorney, Agent, or Firm—Lowe, Price, LeBlanc, Becker & Shur

[57] ABSTRACT

A closed loop thermodynamic system that recirculates a vaporizable working fluid between its liquid and vapor states includes a thermal regeneration unit that receives exhausted working fluid after its utilization in an energy-utilizing device and transfers a portion of the enthalpy contained therein to a pressurized flow of condensed working fluid to a vaporizing unit in the system. Uncondensed exhausted vapor, after regenerative heat has thus been extracted, is then directed to a condensing unit of known type for condensation therein and collection in a condensate-holding unit. Condensation formed from the exhausted vapor during the course of the regenerative heat transfer therefrom is collected in a pool in the regeneration unit and is transferred to join the condensate in the condensate-holding unit to be flowed through the regeneration unit for regenerative heating therein. A pump is provided between the condensate-holding unit and the vaporizing unit to ensure that the regenerative heating is provided to liquid working fluid at the highest pressure in the system regardless of the different heights at which the various units are located.

14 Claims, 3 Drawing Sheets

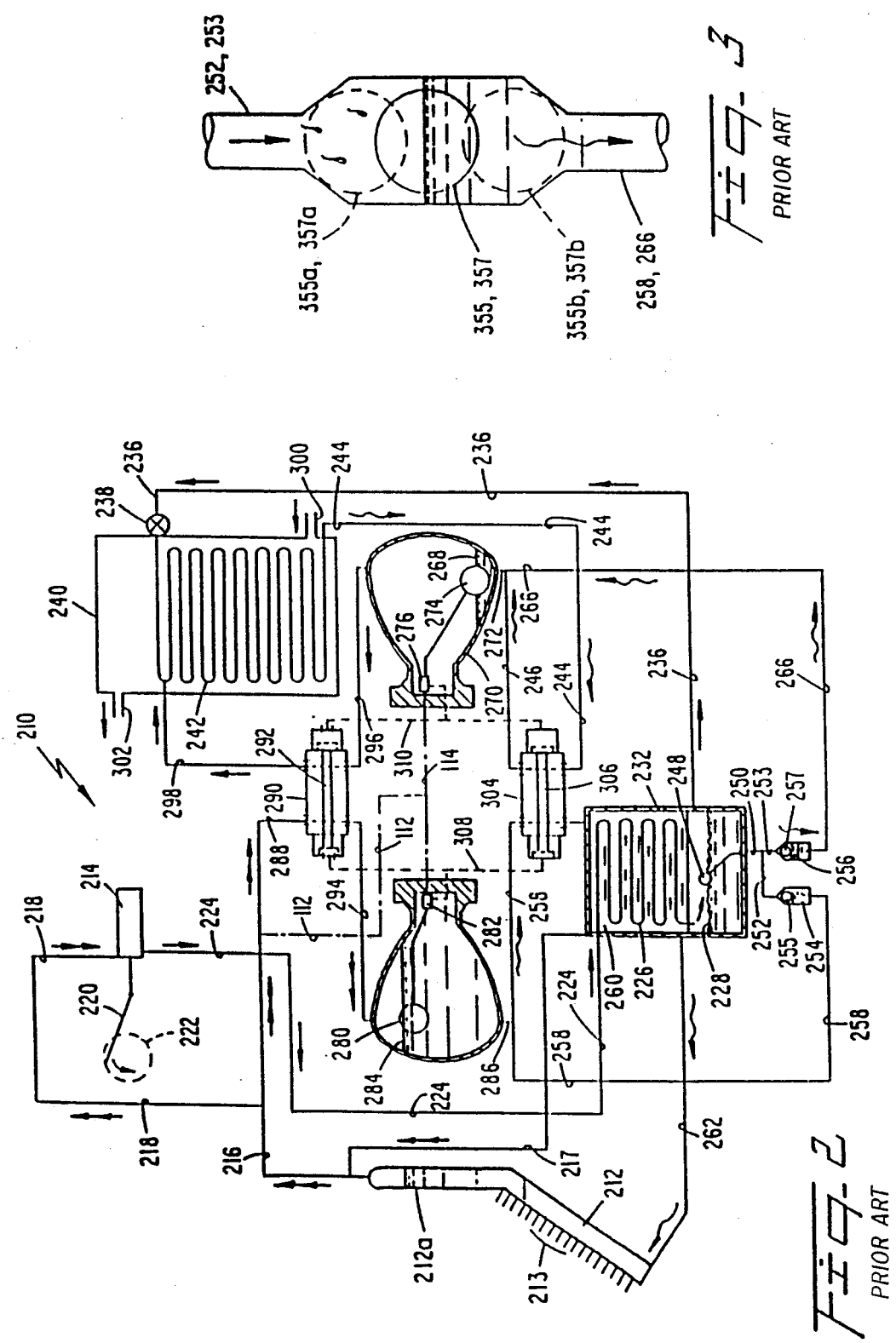

CLOSED LOOP SYSTEM WITH REGENERATIVE HEATING AND PUMP-DRIVEN RECIRCULATION OF A WORKING FLUID

TECHNICAL FIELD OF THE INVENTION

This invention relates generally to systems for recirculating a working fluid undergoing phase changes in a closed thermodynamic system and, more particularly, to a closed loop recirculation system in which a flow of a working fluid is subjected to thermal regeneration so that the working fluid in its liquid state is preheated prior to vaporization by recovery of a portion of the enthalpy contained in the vaporized working fluid that has performed its useful function in a closed cycle, the recirculation flow being maintained through differences between relatively high and low pressures within the system and assisted by a pump.

BACKGROUND OF THE PRIOR ART

Closed loop thermodynamic systems utilizing a vaporizable fluid, for the transfer of energy from an energy source to an energy utilizing means or for conversion of energy from thermal energy to mechanical energy, are well known. Such systems are particularly suited for solar energy conversion establishments in remote locations.

Typically, in a closed loop thermodynamic system of the type contemplated in relation to the present invention, a vaporizable working fluid undergoes a change of state from its liquid to its vapor form and back during a complete thermodynamic cycle. The system typically includes a boiler or other comparable element that receives thermal energy from an external energy source, e.g., the sun or a furnace, to vaporize the working fluid from its liquid to its vaporized state, energy utilizing means such as an engine connected to the boiler to receive the vaporized working fluid therefrom at a relatively high specific enthalpy, a condenser or the like that serves as a heat sink and condenses exhausted vaporized working fluid to its liquid state following its productive use in the heat utilizing means, and appropriate well known piping and means such as a pump to transfer the condensed working fluid back to the boiler with or without natural convection.

As persons skilled in the art must know, in such a closed loop thermodynamic system the Second Law of Thermodynamics requires that at least a portion of the energy received from the external energy source be rejected to a low temperature heat sink for the thermodynamic cycle to repeat itself. Such persons will also appreciate that the condensate formed in the condenser is at a relatively low pressure in the system and that cyclical operation of the system requires that the pressure of this liquid working fluid be raised to the working pressure of the boiler.

It is also well known in the thermodynamic arts that thermal regeneration, i.e., transfer to the condensate of some of the heat that must be surrendered by the system to the low temperature heat sink, prior to reentry of the condensate into the boiler, has the effect of increasing the thermodynamic efficiency of the system. This step of thermal regeneration is most effective, under most practical operating conditions, when the regenerative heat transfer causes energy to be added to the condensate after its pressure has been raised to essentially its highest value, e.g., soon after it exits from a flow pump if one is provided in the system.

Closed loop thermodynamic systems, particularly for solar energy conversion establishments, tend to operate at relatively low temperatures and may utilize liquids other than water as the working fluid. Fluids found to be relatively convenient for such uses include various freons and ammonia. Obviously, leakage of such a working fluid from the system can be both expensive and undesirable in that it would release a pollutant to the atmosphere. Pumps with excellent sealing are known and are readily available for use in such systems and, generally, require only periodic maintenance with controllable consequential interruption in the operation of the overall system.

An example of a pumpless system without regeneration, titled "Closed Loop Solar Collective System Powering a Self-Starting Uniflow Engine", U.S. Pat. No. 4,698,973, was issued to me on Oct. 13, 1987. It is incorporated herein by reference for its teaching of a closed loop thermodynamic system the efficiency of which can be improved by the provision of thermal regeneration. In this prior art system, the boiler element contains liquid working fluid approximately at a level at which two interconnected and cooperating working fluid holding tanks are located below a condenser element. A uniflow reciprocating vapor driven engine, preferably delivering useful mechanical output at a rotating shaft, is utilized as an exemplary "heat-utilizing" device in this known system.

Another patent, U.S. Pat. No. 4,805,410, issued to me on Feb. 21, 1989, titled "Closed Loop Recirculation System for a Working Fluid With Regeneration," teaches a pumpless system that provides the benefits of a regenerative system and, like my earlier cited patent, operates without a pump. Both these patents, U.S. Pat. Nos. 4,698,973 and 4,805,410, are incorporated herein by reference, especially for their teaching of the manner in which the working fluid recirculates in a closed loop without a pump.

There is, however, a need for a highly dependable and improved closed loop recirculation system in which the working fluid is provided with thermal regeneration, in which working fluid pressure differences are enhanced by a pump in the system which utilizes the boiler and condenser pressures and the force of gravity to the extent possible, and provides recirculation with thermal regeneration in a safe, reliable and efficient manner while effecting the necessary working fluid flows.

DISCLOSURE OF THE INVENTION

Accordingly, it is an object of this invention to provide a highly dependable closed loop recirculation system for a working fluid with thermal regeneration.

It is another object of this invention to provide a closed loop recirculation system for a working fluid provided with thermal regeneration, wherein the system operates by natural convection and the application of relatively high and low pressures available within the system as supplemented by a pump provided in the system.

It is a further object of this invention to provide a closed loop recirculation system including a pump for circulating condensed working fluid, wherein heat transfer for thermal regeneration of the working fluid is effected by transferring heat from exhausted working fluid vapor to condensed working fluid at approximately the highest working fluid pressure in the system.

These and other objects of this invention are realized by providing a closed loop thermodynamic system, in which a recirculating working fluid undergoes changes between its liquid and vapor phases in a working cycle. Energy received from an external energy source is utilized to vaporize the working fluid at a high pressure in a boiler unit and the vapor is utilized in an energy utilizing device, e.g., an engine producing mechanical power output at a rotating shaft, whereafter the utilized vapor is condensed at a relatively lower pressure in a condensing unit into a liquid condensate returned to the boiler unit for repeating of a thermodynamic cycle. The condensate flow between the condensing unit and the boiler unit is flowed through a thermal regeneration unit for providing regenerative heating of the condensed working fluid. A pump, preferably coupled directly to a drive or output shaft of the engine, is provided and is connected so as to facilitate flow of liquid condensate from a low pressure, e.g., a condenser pressure, to a pressure at least as high as the boiler operating pressure. The system topology, since fluid flow is enhanced by the pressure increase provided by the pump, allows an energy utilizing device in the system, e.g., an engine, to be locatable above or below the condensing unit as is most convenient.

The regeneration unit according to a preferred embodiment of this invention is formed to have a first portion with a condensate flow passage having a thermally conductive wall, and is also connected to the energy utilizing device so as to receive utilized vapor exhausted therefrom into a second portion of the thermal regeneration unit. This second portion is connected to the condensing unit to transfer thereto at least a portion of said received utilized vapor. The first portion of the regeneration unit is connected to the boiler unit to deliver regeneratively heated condensate thereto at a high pressure provided by the pump, and the second portion of the regeneration unit communicates with the condensing unit of the system, whereby any utilized vapor received but not condensed in the second portion of the regeneration unit is conveyed to the condensing unit and any condensate formed from the utilized vapor in transferring energy to the condensate flowing through the first portion is collected within the second portion of the regeneration unit for one-way delivery to a holding tank that is at a lower pressure. The holding tank receives this condensate from the regeneration unit under the influence of a pressure differential between the pressure in the second portion of the regeneration unit and its own relatively lower pressure maintained by communication with the system's condensing unit.

In this disclosure, there are illustrated and described below only the preferred embodiments of the invention, but it is to be understood that the invention is capable of use in various other combinations and environments and is capable of changes or modifications within the scope of the inventive concept as expressed herein.

BRIEF DESCRIPTION OF THE DRAWINGS

FIG. 2 is a partially sectioned schematic diagram illustrating in relevant part an improvement to the system of FIG. 1, wherein the improvement comprises a thermal regenerator and associated valves and piping according to a preferred embodiment of my earlier-cited U.S. Pat. No. 4,805,410.

FIG. 3 is a vertical cross-sectional view of a preferred form of a floating-ball type of check valve used to automatically control part of the working fluid flow in my U.S. Pat. No. 4,805,410.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
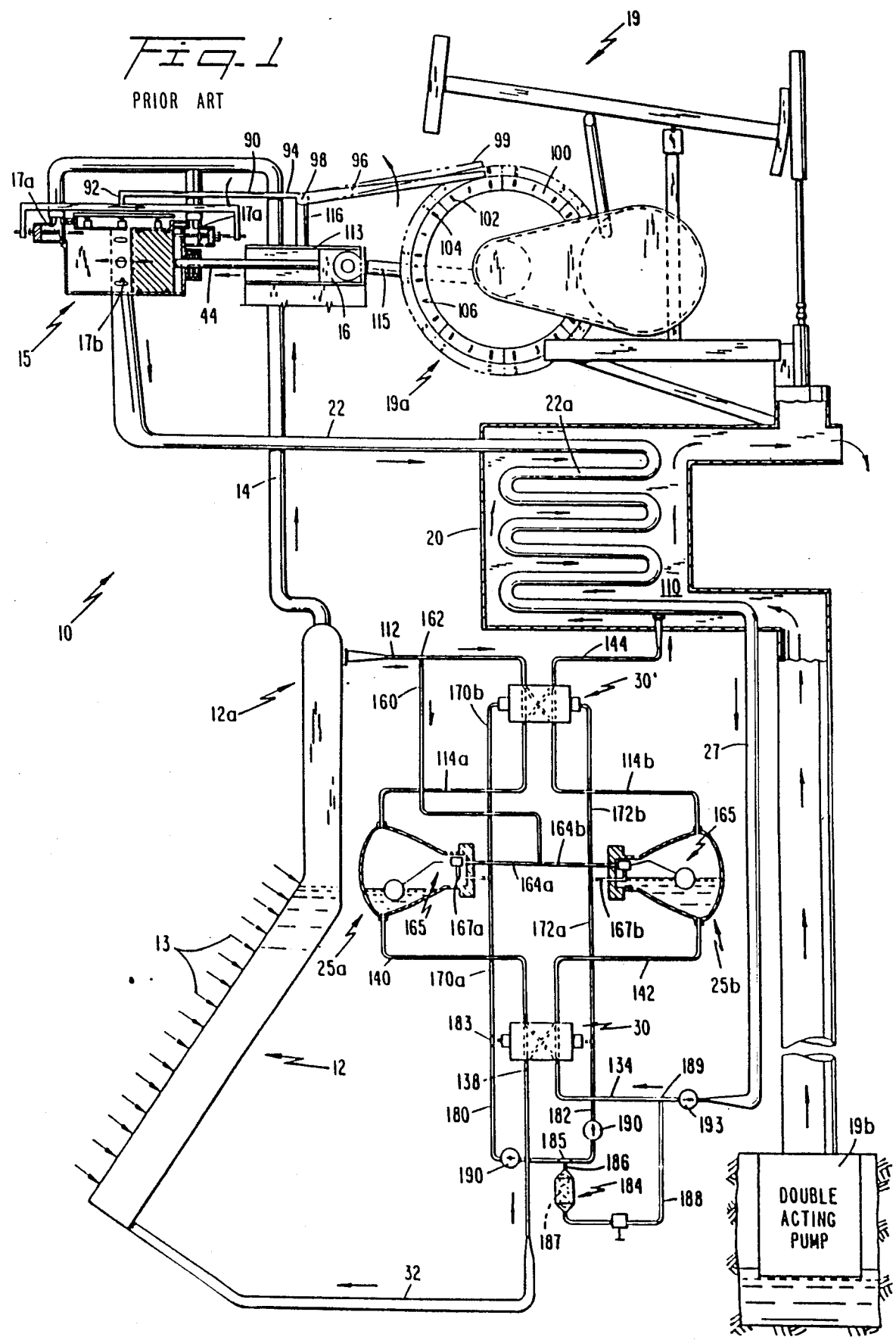
FIG. 1 is a partially sectioned schematic illustration of a closed loop thermodynamic system that includes two cooperating liquid working fluid holding tanks and an exemplary solar energy powered boiler as taught in my earlier-cited U.S. Pat. No. 4,698,973.

An exemplary closed loop energy conversion system, in which a working fluid recirculates without thermal regeneration, as illustrated in FIG. 1 (prior art), typically comprises a boiler 12 that receives energy 13 (such as sunlight directed to a solar energy collection surface) and utilizes this energy to convert a vaporizable working fluid, e.g., water, ammonia, or a freon, from its liquid state to its vaporized state in an upper portion 12a. This vaporized working fluid is conveyed by a pipe 14 to a heat utilizing device, for example a reciprocating engine in which the fluid expands against a slidable piston 16 to cause rotation of a crank shaft coupled to a flywheel 19a to deliver mechanical output at a rotating shaft connected thereto. Assorted combinations of valves, linkages and the like, such as elements 15, 19, 96, may be employed to effect regulation of the engine. Any other heat utilizing means, e.g., a space-heating radiator, a turbine, a chemical heating vat, etc., can serve as a heat utilizing means instead of or in addition to the exemplary uniflow engine illustrated in FIG. 1.

Exhausted vapor, i.e., vapor from which a portion of its enthalpy has been lost in passing through the exemplary engine, leaves the engine through a series of ports, typified by 17b, and is carried through line 22 into a cooled coil 22a in a condenser unit 20. A supply of cooling water 110 flows through condenser unit 20 to remove some of the enthalpy contained in the exhausted working fluid vapor to cause the same to change from its vaporized state to its liquid state. The condensed liquid then passes therefrom under gravity, at least in the system illustrated in FIG. 1, and through an assortment of valves and interconnected lines is selectively directed, in alternation, to one of two holding tanks 25a and 25b. Each of these tanks is selectively connectable to either the high pressure vapor region 12a in boiler 12 or the low pressure exhausted vapor region at a point in condenser coil 22a.

By judicious manipulation of valves such as 30 and 30', high pressure vapor from boiler 12 is provided into the upper reaches of the particular holding tank which at that time is discharging condensate to the lower region of boiler 12, while the other holding tank is connected to the low pressure regions of condenser tube 22a to apply a vacuum or subatmospheric pressure to facilitate the filling of that tank with condensate condenser 20. A detailed description of the manner in which such a basic system may be operated is provided in my U.S. Pat. No. 4,698,973, the related teaching of which is incorporated herein by reference.

It is important to appreciate that the prior art system illustrated in FIG. 1 does not employ a separate pump element and that, therefore, it is simply a combination of natural convection (this being the consequence of differences in density between cold and hot condensate in different portions of boiler 12 and the difference in densities between the vapor and liquid phases of the working fluid in boiler 12), gravitational forces (as would tend to generate a downward flow of condensate from condenser 20 and eventually into holding tanks 25a and 25b), and the selected application of relatively high or low system pressures, e.g., that of boiler pressure from line 112, through valve 30, and line 114a to liquid working fluid collected as condensate in tank 25a to enable movement thereof through lines 140, valve 30, line 138 and line 132 into boiler 12 or, on the other hand, the application of the relatively low condenser pressure of condenser coil 22a through line 144, valve 30′, and line 114b to holding tank 25b to facilitate entry thereinto of condensate from condenser 20 through line 27, valve 193, line 134, valve 30, and line 142 into holding tank 25b for eventual discharge therefrom under boiler pressure into boiler 12.

Such a system, therefore, must be structured with certain geometric, i.e., topological, constraints in mind. Specifically, these include the location of condenser 20 to be at all points above holding tanks 25a and 25b, and the disposition of boiler 12 such that the meniscus of the liquid working fluid therein can be close to the level of the condensate in either of tanks 25a and 25b (preferably never higher than the highest level attainable by the liquid working fluid in either holding tank). In general, so long as the heat utilizing means does not extract so much enthalpy from the working fluid as to render it substantially liquid, exhausted vapor therefrom will flow freely from the heat utilizing means to the condenser 20 even if the latter is located physically higher.

As persons skilled in the art will appreciate, the overall thermal efficiency of any such system, even with the best available technology, will not be very high. Any improvement in the thermal efficiency, while small in absolute terms, therefore represents a relatively significant improvement and is highly desirable if it can be attained without undue expense or complication. This can be accomplished as taught in my U.S. Pat. No. 4,805,410, by adding to the system a very simple thermal regeneration means that is conveniently located at a level below the lowest level attainable by the liquid working fluid in either of two holding tanks comparable to holding tanks 25a and 25b, and utilizing the highest and lowest available operating pressures within the system to promote additional flows of vapor and liquid working fluid to transfer some of the residual enthalpy in the exhausted working fluid after it leaves the engine, as well as any heat utilizing means present in addition to the engine, to increase the enthalpy of liquid working fluid entering the boiler at a relatively high pressure.

For ease of distinct reference, various elements in FIG. 2 are numbered with higher order numbers, e.g., the boiler is numbered 212 instead of 12 as in FIG. 1. In similar manner, elements in FIG. 4 are numbered with even higher order numbers, e.g., the boiler is numbered 412 instead of 212 as in FIG. 2 or as 12 in FIG. 1.

Also, for the reader's convenience in following the various flows of the working fluid in its liquid and vapor phases in FIGS. 2, 3 and 4, the directions of flow are indicated by arrows that are categorized as follows: straight arrows with two successive heads indicate the direction of flow of high pressure vaporized working fluid; straight arrows with single heads are used to indicate the direction of flow of exhausted working fluid after it leaves a heat utilizing means; arrows with wavy shafts and single heads are used to indicate the direction of flow of liquid working fluid; and arrows with heads and tails are used to indicate the direction of flow of a cooling fluid provided from an external source to the condenser to substantially extract the latent heat of condensation from vapor that is to be condensed therein.

Figure 4:
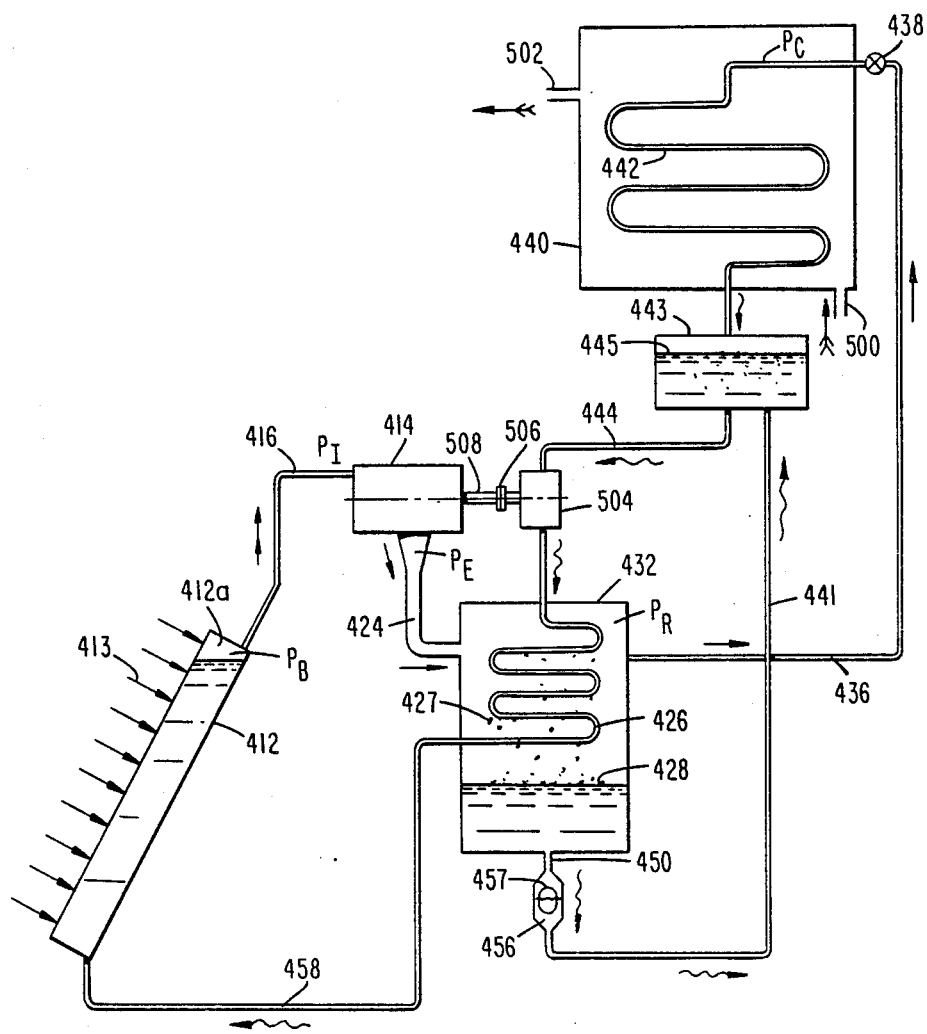
FIG. 4 is partially sectioned schematic illustration of a closed loop thermodynamic system according to a preferred embodiment of the present invention, including an exemplary engine-driven pump for flowing condensed working fluid through a regenerator.

Referring now to FIG. 4, the closed loop recirculation system with thermal regeneration includes a vaporizing means 412, e.g., a boiler unit, receiving energy 413 from an external source such as the sun by way of a solar energy collector (not shown in FIG. 4), to generate a phase change in the working fluid from its liquid state to its vapor state. The vapor so generated will be at close to the highest pressure in the system and will be located in the space 412a above the meniscus of the liquid working fluid being evaporated therebelow. This high pressure, high enthalpy vapor in a simple system, because it is in contact with the liquid phase, will be a saturated vapor. Persons skilled in the art will appreciate that with very little change to the structure illustrated in FIG. 2, additional energy from an external source can be provided to the vapor in leaving the space 412a of vaporizing unit 412, e.g., by a known superheater to cause the initially saturated vapor therein to become superheated but at no higher than the boiler saturation vapor pressure $P_B$. In any event, this high pressure vaporized working fluid, whether it is saturated or superheated, leaves the vaporizing unit 412 through line 416 connected to a vapor intake of an engine 414 that typically rotates a coupling on a rotating output shaft 417.

As persons skilled in the art will immediately appreciate, it is not necessary that any particular type of engine be used, and that a heat utilizing means, e.g., a space-heating radiator, a process element in a chemical plant in which heat is to be provided, or the like, may also be optionally included in the system. Such an optional additional heat-utilizing means, like the engine, would receive vaporized high enthalpy vaporized working fluid, utilize some of the energy contained therein, and exhaust low enthalpy working fluid as a relatively low pressure vapor that would be flowed to a condenser unit to be condensed therein for return to the boiler unit. Such a heat utilizing means if present, could be corrected either in parallel to the engine or even in series therewith, in known manner.

The engine 414 utilizes some of the enthalpy in the high pressure vaporized working fluid and exhausts the working fluid vapor at a somewhat lower enthalpy to an exhaust line 424 at an engine exhaust pressure $P_E$, where $P_E < P_B$. In the prior art system of FIG. 1, this exhaust vapor is conveyed directly to a condenser unit 20 in which an external supply of cooling water is utilized to extract sufficient enthalpy to cause a phase change from low pressure working fluid vapor to liquid condensate for recirculation.

In the present invention, however, as best understood with reference to FIG. 4, the exhausted working fluid, still in its vaporized state, is conducted through line 424 to surround an exemplary heat transfer coil 426 made of a thermally conductive material, e.g., copper, so that heat transfer can take place across the wall thereof. The exhausted working fluid vapor leaves the engine 414 at pressure $P_E$ and flows to the lower pressure $P_R$ in the regenerator chamber outside of coil 426. This vapor, which by now may be wet vapor, loses a considerable portion of its enthalpy to become even wetter as it loses energy by heat transfer across the thickness of the wall of coil 426 to condensed working fluid flowing therethrough. As a consequence, a substantial portion of the working fluid vapor flowing into regenerator 432 condenses as condensate drops 427 that collect in a condensate pool 428 in the lower portion of the regenerator chamber 432.

Persons skilled in the art of heat transfer and fluid mechanics can be expected to select the materials, internal configuration, surface areas, and flow rates, as most appropriate for a given application, in designing and sizing regenerator 432.

As will be understood, as the exhausted working fluid vapor loses energy, to the condensate flowing through coil 426 in the regeneration process, its pressure will drop. Hence, $P_R < P_B$. This pressure drop serves to facilitate flow of exhausted working fluid vapor from the boiler 412 through engine 414 into regenerator 432. Not all of the working fluid vapor is thus totally condensed in the regenerator 432, and the portion of vapor that has not so condensed flows out of regenerator 432 through pipe 436 to a throttle valve 438, and thus into condenser coil 442 inside a condenser 440.

A supply of cooling water, e.g., from a well or a cooling tower, is provided in known manner through condenser cooling water inlet 500 to remove further enthalpy from working fluid vapor flowing through condenser tubing 442. This causes an increase in the temperature of the cooling water flow that exits condenser 440 at the cooling water exit 502. Once again, persons skilled in the art can be expected to select and size condenser 440 for most economical operation to ensure complete condensation of all the working fluid vapor flowing through throttle valve 438 into condenser coil 442. The condensate so generated is collected in a condensate sink 443 which should be at approximately the condenser low pressure $P_c$. This pool of condensed working fluid 445 communicates through a pipe 444 with the inlet of a rotary pump 504 coupled at coupling 506 to be rotated by driveshaft 508 of engine 414. This is merely an exemplary arrangement and such a direct coupling between pump 504 and an output drive shaft of engine 414 is not necessary. In other words, it is conceivable, and under certain circumstances, may even be preferable, to have engine 414 coupled to an electrical power generator (not shown) that is electrically coupled to a drive motor (also not shown) in known manner to drive pump 504.

Pump 504 should be selected according to known principles to most efficiently raise the pressure of condensed working fluid from low pressure $P_C$ to a value sufficiently higher than boiler pressure $P_B$ to ensure that the condensate flow between the exit of pump 504 and the condensate entry to boiler 412 can easily overcome any fluid friction that is bound to be encountered in flowing through regenerator tubing 426 and high pressure condensate flow pipe 458.

For the reader's convenience, the various pressures thus obtained are related as follows: $P_B$ (boiler pressure) is greater than $P_I$ (engine inlet pressure), which is greater than $P_E$ (engine exhaust pressure), which is greater than $P_R$ (regenerator pressure), which is greater than $P_C$ (condenser pressure).

A principal advantage that is obtained with the system according to this invention is that the system designer is free to locate the various components at different heights as most suitable for a particular application, particularly to place condenser 440 higher or lower than the boiler unit 412, engine 414, or regenerator 432. The reasons for this are clearly explained hereinbelow.

Whether the system is intended to be utilized with solar energy 413 (as indicated in FIG. 4) or with any other supply of thermal energy, at the commencement of operation sufficient energy will be absorbed in the liquid working fluid in boiler 412 to generate a head of working fluid vapor 412a at a boiler pressure $P_B$ before any working fluid vapor is directed through line 416 to engine 414. This is most readily accomplished, in known manner, by providing a known type of pressure sensitive means, e.g., a valve that opens at a predetermined boiler pressure, at a vapor delivery end (not explicitly identified in FIG. 4) of boiler 412. Numerous such devices are commercially available and a person skilled in the art can readily select one appropriate for a particular application. Therefore, only working fluid vapor that is at a predetermined high pressure $P_B$, when boiler 412 is in condition to supply the same, will enter engine 414 where it will generate a mechanical output delivered at a rotatable shaft 508. Some of this mechanical output may be utilized to drive condensate pump 504 to obtain results more fully explained hereinbelow. Exhausted working fluid vapor $P_E$ ($P_E$ less than $P_I$) leaves engine 414 through pipe 424 to enter regenerator 432.

It should be understood, as was indicated earlier, that the system according to this invention most likely will utilize a working fluid that should not be allowed to leak out of the system as it would be expensive and likely to cause pollution. Therefore, for present purposes it will be understood that the system, insofar as flows of the working fluid are concerned, is a sealed system. The through flow of a condenser cooling liquid, e.g., water drawn from a well or other similar low temperature source, does not have to be sealed. As a consequence, $P_R$ less than $P_E$ is an inequality that will be realized from the very start of operation.

As the exhausted working fluid vapor condenses into drops 427 in regenerator 432, it will collect as a liquid in pool 428. That working fluid vapor which has not so condensed will flow through pipe 436 to throttle valve 438, of known type, which can be set and, if necessary, adjusted, to ensure that $P_R$ is greater than PC, the pressure inside condenser tubing 442. Since the condenser coolant flowing into the condenser 440 at 500 and leaving at 502 keeps the temperature outside condenser coil 442 low, any working fluid vapor that passes throttle valve 438 will lose heat in condenser 440 and condense into a liquid form collected in condenser sink 443 in pool 445. Condenser sink 443, therefore, should be at low pressure $P_C$. In other words, up to this point, regardless of the heights of individual components of the system, once high pressure working fluid vapor at boiler pressure $P_B$ leaves the boiler, its path through the disclosed system until it becomes a liquid condensate in pool 445 faces no major problems and is naturally obtained by a sequence of components each having a successively lower pressure. Consequently, as persons skilled in the art will appreciate, up to this point there are no natural restrictions in the heights at which the various components may be located in a practical system.

However, depending on the vertical location of condenser sink 443 containing the high density liquid working fluid vis-a-vis boiler 412, the presence of a pump 504 may become essential. Specifically, ignoring for the present the need to overcome fluid friction, it should be clear that pump 504 must generate a sufficiently high head to move condensed liquid working fluid from pool 445 at $P_C$, the lowest pressure in the system to the boiler which is at $P_B$, the highest pressure in the system. As a matter of fact, if working fluid vapor 412a in boiler 412 is at a particular pressure $P_B$, liquid working fluid having received heat from regenerator 432 and flowing through heat condensate pipe 458 would have to overcome not only pressure $P_B$, but also the head corresponding to the height of the vapor/liquid interface in boiler 412 with respect to pipe 458. It should thus be clear that the provision of a pump 504 is not only helpful, but is essential in a system that has components at very different heights. Incidentally, it should be noted and understood that if an optional heat utilizing means is provided, either in parallel or in series with engine 412, so long as the exhausted vapor therefrom were to enter regenerator 432 in the same manner as exhausted working fluid vapor from the engine enters regenerator 432, all the other relationships described hitherto will prevail.

It should be remembered that no high pressure working fluid vapor leaves boiler 412 until the boiler pressure exceeds or is equal to a predetermined pressure $P_B$. As this vapor passes through pipe 416 to engine 414, there may be some pressure drop due to frictional losses and, therefore, $P_I$ will be less than $P_B$ but, nevertheless, will be sufficiently high to generate a rotational output for engine 414. Consequently, engine output shaft 508, coupling 506, and the rotating parts of pump 504 will turn. Thus, before any working fluid vapor has passed through the engine in a useful manner, pump 504 goes into operation. As will be appreciated, the rate of flow of working fluid vapor from the boiler will determine the power generated by engine 414 and, depending on controls exercised in known manner, the rotating speed and throughput of pump 504. These are parameters that can be readily determined and/or adjusted by a user of the system in known manner.

What is essential and is readily achieved here where the engine 414 directly drives the pump 504 is that flow of the working fluid vapor from the boiler, all the way through the system to condensate pool 445, is obtained in the system right from the start without the need for a pump. Pump 504 receives liquid working fluid from pool 445 at a low pressure $P_C$ and, by the input of mechanical power received from engine 414, causes its pressure to rise to a pressure at least as high as boiler pressure $P_B$. In fact, in a practical system, the pump exit pressure must be high enough to overcome all frictional losses between the pump outlet and boiler 412. What is important to appreciate is that the liquid working fluid flowing out of pump 504 is at the highest pressure in the system and, therefore, is in a condition to most efficiently receive regenerative heat in regenerator 432 from exhausted working fluid vapor delivered to regenerator 432 through pipe 424. As persons skilled in the thermodynamic arts will appreciate, heat thus recovered from the exhausted working fluid vapor is not lost to the external flow of condenser coolant. Hence, for every unit of energy 413 received by the sealed recirculating system with regeneration, the very presence of regenerator 432 ensures that a smaller amount is lost to condenser coolant flow than would otherwise be the case. This, consequently, increases the overall thermal efficiency of the system. As a result, a relatively small, relatively compact, and relatively inexpensive system can more readily perform a given task with regeneration than the system could have without regeneration. In the alternative, a given system with regeneration can produce a higher mechanical output that may be utilized advantageously in a more efficient manner for a given size of the system and for a given energy input rate thereto.

That working fluid vapor which condenses to join pool 428 in regenerator 432 is at a pressure $P_R$ which is higher than pressure $P_C$ of condensing vapor in condenser 440. Therefore, this pressure difference is available to cause convectional, pressure-assisted, flow of condensed working fluid from pool 428 through pipe 450 to float valve 456 and pipe 441 to join with the rest of the condensed working fluid in pool 445. Float valve 456 may conveniently be of a floating ball-type which ensures that if there is any sudden interruption in the energy flow to the system then liquid pool 445, in the event that it is located at the greater height than regenerator 432, will not back flow to flood regenerator 432 or, in an extreme situation, flow back all the way into engine 414.

Once the system commences operation, it should very soon attain a steady state operation. Under steady state conditions, energy 413 will be received from an external source at a predetermined rate, a portion of it will be provided to engine 414 and some of it will be converted into useful output and the rest sent to regenerator 432 with the exhausted working fluid vapor. Of this, a portion will be recovered by high pressure condensate flowing through regenerator 432 back into the boiler. The balance of the energy will be transferred by the flow of that exhausted working fluid vapor which did not condense in regenerator 432 and will be lost in the condenser 440 to the flow of condenser coolant through pipes 500, the condenser 440, and 502 leading therefrom.

When the source of energy supply is interrupted or operation of the system is to be terminated, energy flow 413 will diminish to a point at which transfer of the working fluid from its liquid to its vapor state within the boiler is no longer sustainable at a useful flow rate. At this point, in known manner, the flow of working fluid vapor at high pressure $P_B$ to pipe 416 leading to engine 414 may be terminated. The system will then cool down and attain its non-operative rest state to await a further influx of energy 413 to recommence operation. Naturally, the sealing of the various components of the system must be selected to cope with the pressure changes, the temperature changes, and the mechanical loads to be anticipated during operation.

In the improved system according to the present invention, as in the prior art systems, the heat utilizing means 414 can be located to be above or below the condensing means 240 unless so much enthalpy is removed from the incoming high pressure vapor in the heat utilizing means as to cause the utilized vapor to become substantially a liquid. Even if such a situation were to arise temporarily, e.g., where the heat utilizing means is a space heating radiator in a very cold location and the initial inflow of working fluid thereto is at a rate that is temporarily very low, a conventional condensate trap (not shown) may be provided at the heat utilizing means to be connected to function with the rest of the system in known manner.

Still other objects and advantages of the present invention will become readily apparent to those skilled in this art from the description of the invention provided herein. Although only the preferred embodiment of the invention is illustrated and described, this is intended to be by way of illustration of the best mode contemplated for carrying out the invention. As will be realized, the invention itself is capable of other and different embodiments, and its several details are capable of modification in various obvious respects. Accordingly, the drawings and the description provided hereinabove should be regarded as illustrative in nature and not as restrictive, the invention being defined solely by the claims appended below.

What is claimed is:

1. A closed loop thermodynamic system, wherein a recirculating working fluid cyclically undergoes changes between its liquid and vapor phases during which energy received from an external energy source is utilized to vaporize the working fluid at a high pressure in a vaporizing means and the high pressure vapor is utilized in an energy-utilizing means and is exhausted therefrom, various components of the system being located at different heights relative to each other, comprising:

thermal regeneration means for providing regenerative heating of a flow of working fluid in the form of a condensate that is at a pressure not less than an operating pressure of said vaporizing means, said regeneration means being formed to have a first portion and a second portion separated therefrom by a heat-conducting wall, said first portion being formed to convey said condensate therethrough to regeneratively heat the same, said second portion being connected to said energy utilizing means to receive said exhausted vapor to transfer therefrom a portion of the enthalpy thereof across said heat conducting wall to said condensate flow through said first portion, said second portion of said regenerative means also being provided with a vapor outlet and being formed in part to hold a pool of liquid working fluid formed by condensation of a first portion of said exhausted vapor that has condensed due to said energy transfer therefrom, said pool having an outlet with a one-way outflow valve;

vapor condensing means connected to said vapor outlet of said regeneration means to receive therethrough such of said exhausted vapor as did not condense in said first portion, to condense the same by a further transfer of thermal energy therefrom;

condensate-holding means for holding condensate formed in said condensing means, said condensate-holding means also being connected to said valve of said regeneration means to receive condensate therethrough from said pool and being connected to said first portion of said regeneration means to provide said flow of condensate to be heated in flowing therethrough; and condensate pressurizing means intermediate said condensing means and said first portion of said regeneration means to raise a pressure of said first flow of condensate to a value not less than said operating pressure of said vaporizing means.

2. The closed loop thermodynamic system according to claim 1, wherein:

said condensate pressurizing means comprises pump means receiving energy from said energy-utilizing means to provide said pressurization of said condensate flow to said vaporizing means.

3. The closed loop thermodynamic system according to claim 2, wherein:

said pump means is adapted to be driven by power received from said energy-utilizing means.

4. A closed loop thermodynamic system according to claim 3, wherein:

said energy-utilizing means comprises engine means for converting thermal energy to a mechanical output deliverable at a rotating shaft coupled to said pump means to power the same.

5. A closed loop thermodynamic system according to claim 1, wherein:

said one-way outlet valve comprises a body freely floatable in liquid working fluid so as to prevent a flow of liquid working fluid from said condensate-holding means into said second portion of said regeneration means when in a liquid-sealing position and to prevent flow of exhausted vapor from said regeneration means to said condensate-holding means when in a vapor-sealing position.

6. The closed loop thermodynamic system according to claim 5, wherein;

said floatable body of said valve is loosely contained in a valve housing formed to have a generally conical inside upper liquid-sealing surface sealingly contactable by said floating body in said liquid-sealing position and a generally conical inside lower vapor-sealing surface contactable by said floatable body in said vapor-sealing position, such that when said floatable body is intermediate said liquid-sealing and said vapor-sealing positions thereof, flow of liquid working fluid from said regeneration means occurs past said floating body.

7. The closed loop thermodynamic system according to claim 6, wherein:

said floatable body has the form of a sphere.

8. A closed loop thermodynamic system, wherein recirculating working fluid cyclically undergoes changes between its liquid and vapor phases in a working cycle, in which energy received from an external energy source is utilized to vaporize the working fluid at a high pressure in a vaporizing means and the vapor is utilized in an energy-utilizing means that exhausts the utilized vapor at a lower pressure to be condensed thereafter, wherein different components of the thermodynamic system are located at different heights relative to each other, comprising:

thermal regeneration means for receiving said utilized working fluid vapor from said energy-utilizing means to transfer regenerative heating energy therefrom by heat transfer across a thermally-conductive wall to a flow of condensed working fluid passed through said regeneration means;

condensing means for condensing utilized working fluid vapor received after said heat transfer therefrom to convert the same into condensate held in condensate-holding means provided therefor; and piping means connecting said regeneration means to said condensing means to convey uncondensed utilized working fluid vapor thereto and also connected to said condensate-holding means to convey thereto any condensate formed from said utilized working fluid in said regeneration means due to said heat transfer therefrom; and pressurizing means provided intermediate said condensate-holding means and said regeneration means, to effect an increase in pressure of condensate transferred from said condensate-holding means through said regeneration means to said vaporizing means.

9. A closed loop thermodynamic system according to claim 8, further comprising:

a one-way outflow valve means for controlling a flow of any liquid working fluid formed in said regeneration means from condensation of said exhausted vapor flow therethrough due to said heat transfer therefrom.

10. The closed loop thermodynamic system according to claim 3, further comprising:

throttle means for throttling said flow of exhausted vapor into said condensing means.

11. The closed loop thermodynamic system according to claim 1, wherein:

said vaporizing means comprises a solar energy conversion means for receiving and absorbing incident solar energy for vaporizing the working fluid.

12. The improved closed loop thermodynamic system according to claim 11, wherein:

the working fluid is water.

13. The improved closed loop thermodynamic system according to claim 11, wherein:

the working fluid is freon.

14. The improved closed loop thermodynamic system according to claim 11, wherein:

the working fluid is ammonia.

* * * * *